(12) United States Patent
Chang et al.

(10) Patent No.: US 8,446,380 B2
(45) Date of Patent: May 21, 2013

(54) METHOD AND DEVICE FOR RESISTIVE MULTI-POINT TOUCH

(75) Inventors: Chin-Fu Chang, Taipei (TW); Shang-Tai Yeh, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 652 days.

(21) Appl. No.: 12/640,753

(22) Filed: Dec. 17, 2009

(65) Prior Publication Data

US 2010/0263943 A1 Oct. 21, 2010

Related U.S. Application Data

(60) Provisional application No. 61/245,063, filed on Sep. 23, 2009.

(30) Foreign Application Priority Data

Apr. 17, 2009 (TW) .............................. 98112745 A (51) Int. Cl.
*G06F 3/041* (2006.01)
(52) U.S. Cl.
USPC ..... 345/173; 345/174; 178/18.01; 178/18.03; 178/18.05

(58) Field of Classification Search
USPC .................... 345/173, 174; 178/18.01, 18.03, 178/18.05
See application file for complete search history.

(56) References Cited

U.S. PATENT DOCUMENTS

| | | | | |
|---|---|---|---|---|
| 4,587,378 A * | 5/1986 | Moore | ........................ | 345/173 |
| 7,236,160 B2 * | 6/2007 | Kong | ........................... | 345/173 |
| 7,327,354 B2 * | 2/2008 | Dotson | ....................... | 345/174 |
| 7,439,961 B2 * | 10/2008 | Kong | ........................... | 345/173 |
| 2009/0127086 A1 * | 5/2009 | Liu et al. | ..................... | 200/512 |
| 2010/0097343 A1 * | 4/2010 | Fang | ............................ | 345/174 |

FOREIGN PATENT DOCUMENTS

CN 101751168 6/2010

* cited by examiner

*Primary Examiner* — Latanya Bibbins
(74) *Attorney, Agent, or Firm* — WPAT, PC; Justin King (57) ABSTRACT

A resistive multi-point touch device and method is disclosed. A plurality of wires intersect each other to form a plurality of intersecting regions. The intersecting wires are separated from each other by a plurality of insulating particles. First, suppressed intersecting regions are sensed, and then contact points on the suppressed intersecting regions are sensed based on the suppressed intersecting regions. Sensing of the suppressed intersecting regions is performed by first sensing suppressed wires, and then determining possibly suppressed intersecting regions based on the suppressed wires, and sensing suppressed intersecting regions based on these possibly suppressed intersecting regions.

17 Claims, 12 Drawing Sheets

Sensing at least a suppressed intersecting region on a resistive multi-point touch device
210

Sensing at least a contact point based on each suppressed intersecting region
220

Respectively driving wires intersecting in each suppressed intersecting regions by providing high and low potentials to two ends of the driven wire
510

When one of a pair of wires intersecting in any suppressed intersecting regions is driven, sensing the other wire not driven in the pair of wires to sense the location of each contact point
520

METHOD AND DEVICE FOR RESISTIVE MULTI-POINT TOUCH

FIELD OF THE INVENTION

The present invention relates to a resistive touch device and method thereof, and more particularly, to a resistive multi-point touch device and method thereof.

BACKGROUND OF THE INVENTION

In U.S. Patent Publication No. 2007/0198926, Jouget et al. disclose a resistive multi-point touch device, which includes an upper electrode layer and a lower electrode layer, respectively provided with a plurality of wires arranged in parallel and oriented in different directions. Insulating particles are distributed between the upper and lower electrodes to separate them from each other (a spacer). When the upper electrode layer is suppressed, portions of the wires on the upper electrode layer will be in contact with the wires on the lower electrode layer, wherein all wires on the lower electrode layer are grounded. The wires on the upper electrode layer are sequentially driven, while the wires on the lower electrode layer are sequentially sensed once for each one of the wires being driven on the upper electrode layer, thereby all intersecting points crossed by the wires on the upper and lower electrode layers can be sensed. As a result, when a wire being driven on the upper electrode layer is suppressed and in contact with the wire being sensed on the lower electrode layer, current will flow from the driven wire on the upper electrode layer to the sensed wire on the lower electrode layer, thus contact points can be determined by sensing signals on the wires of the lower electrode layer.

Figure 1:
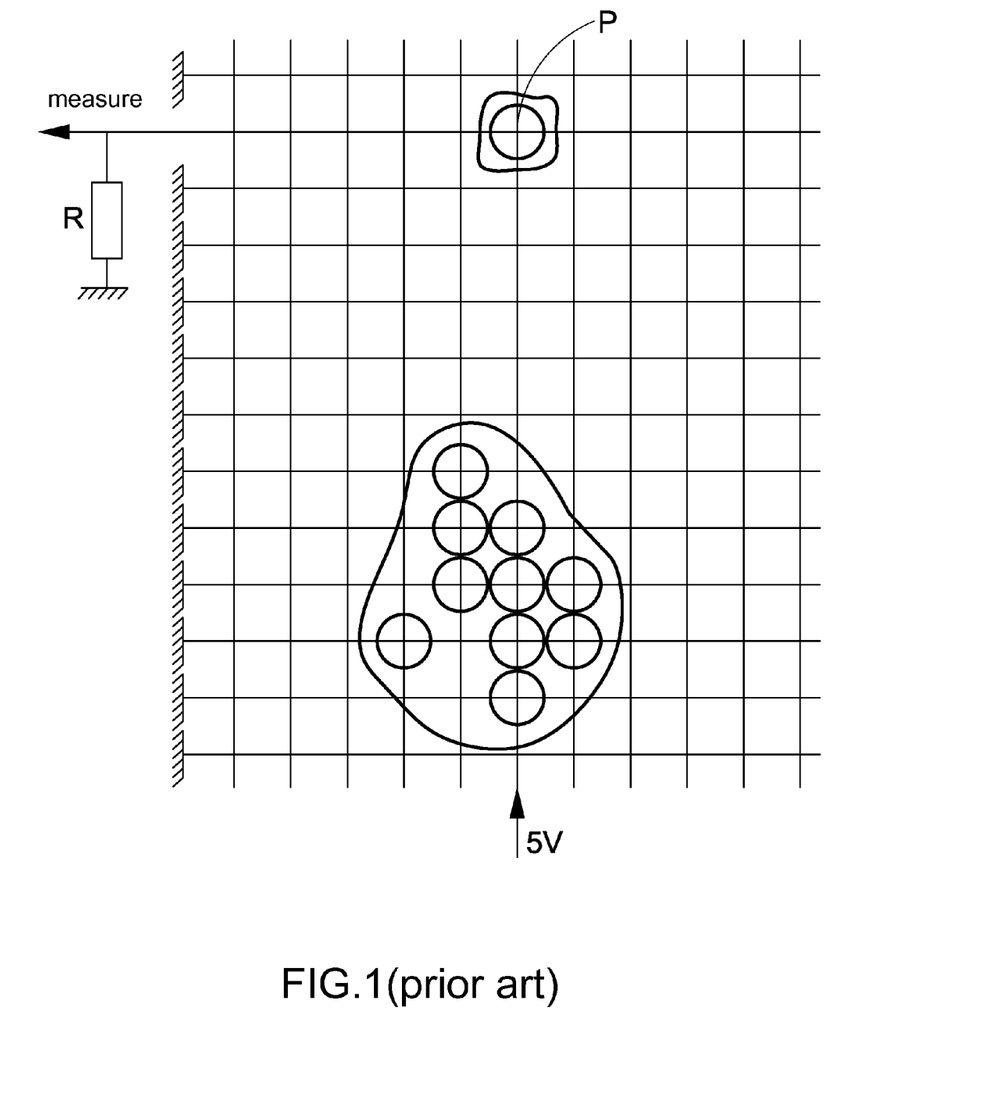
FIG. 1 is a schematic diagram depicting a prior-art resistive multi-point touch device.

As shown in FIG. 1, when a finger suppresses the upper electrode layer, a group of intersecting points may be suppressed at the same time. This may cause the signal on the wires of the lower electrode to become smaller during subsequent sensing, so it is necessary to assign a different comparison value to each intersecting point in order to determine if an intersecting point is being suppressed when the signal is weak. However, such a method may render inaccuracy when the amount of intersecting points being suppressed is large. Obviously, the setting up and storage of comparison values for each intersecting point would take up a considerable amount of time and resources, and still the accuracy may not be satisfactory. Moreover, when the density of the wire increases with the increase of resolution, the frequency for sensing has to be correspondingly reduced.

Therefore, there is a need for a resistive multi-point touch device and method to improve the prior-art problems.

SUMMARY OF THE INVENTION

The present invention discloses a resistive multi-point touching method and device thereof. A plurality of wires intersects with each other to form a plurality of intersecting regions. The intersecting wires are normally separated by a plurality of insulating particles, and in contact with other when suppressed. The suppressed intersecting regions can be sensed, and then contact points on the suppressed intersecting regions can be respectively sensed based on the suppressed intersecting regions. Sensing of the suppressed intersecting regions can be performed by first sensing suppressed wires, and then determining possible suppressed intersecting regions based on the suppressed wires, and suppressed intersecting regions are determined from the possible suppressed intersecting regions.

By sensing suppressed wires beforehand, the range of suppressed intersecting regions to be searched can be reduced. By sensing suppressed intersecting regions, the range of contact points to be searched can be reduced. Therefore, the resistive multi-point touch method and device of the present invention enables quick determination of all contact points, which can be expressed via 2-D coordinates.

The present invention employs wider wires covering wider sensing areas than the prior art, and therefore has better resolution.

In addition, the present invention can simultaneously sense contact points generated by several different objects and used for tracking and determining different gestures.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. In order to illustrate the present invention, some parts of the drawing may not be drawn to scale, in particular, some may be exaggerated for clarity and some may be omitted for conciseness.

Figure 2:
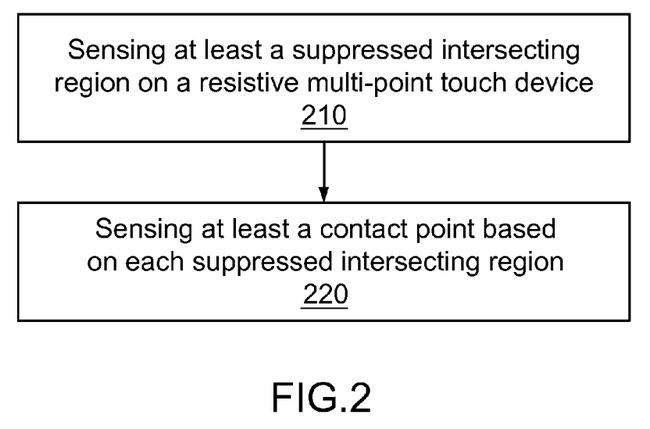
FIG. 2 is a flowchart illustrating a preferred embodiment of the present invention.

One embodiment of the present invention includes a resistive multi-point touch method as shown in FIG. 2. First, as in step 210, at least an intersecting region being suppressed on a resistive multi-point touch device is sensed, and then in step 220, at least a contact point is sensed based on the suppressed intersecting region.

The multi-point touch device includes a plurality of wires, including a plurality of first and second wires superimposed on a plurality of intersecting regions. When at least one object suppresses the device, portions of the first and second wires come into contact with each other, forming at least one contact point corresponding to the suppressing object.

The first and second wires are not in contact with each other when not being suppressed. In an embodiment of the present invention, a plurality of insulating particles or a spacer can be distributed between the first and second wires to separate them for each other. In addition, the present invention does not limit the relative positions of the first and second wires, that is, the first wires may be on the top or the second wires can be on the top. In an embodiment of the present invention, the first and second wires are oriented towards different axes, constructing an intersecting matrix composed of a plurality of intersecting regions. For example, the first wires are oriented in the horizontal direction, while the second wires are oriented in the vertical direction, or vice versa.

The first and second wires may have predetermined widths, so that intersecting regions are formed at the intersections of the first and second wires. It is apparent to those skilled in the arts that the widths of the wires may not necessary be the same, and that each wire can have a different width, and thus the areas of the intersecting regions may also be different, the present invention is not limited to these.

In addition, according to suppressing objects, the amount and areas of the intersecting regions for first and second wires in contact with each other may also be different. In a preferred embodiment, the suppress point on each intersecting region is singular regardless of the suppressed area on this region. Any suppress actions occurred within the range of this intersecting region is regarded as one suppress point. Alternatively, there may be two or more suppress points when the area of intersecting region is large. Under this condition, two different suppress points can be identified based on the order of the suppress actions in time, and the present invention does not limit to just one suppress point in a single intersection region.

Figure 3:
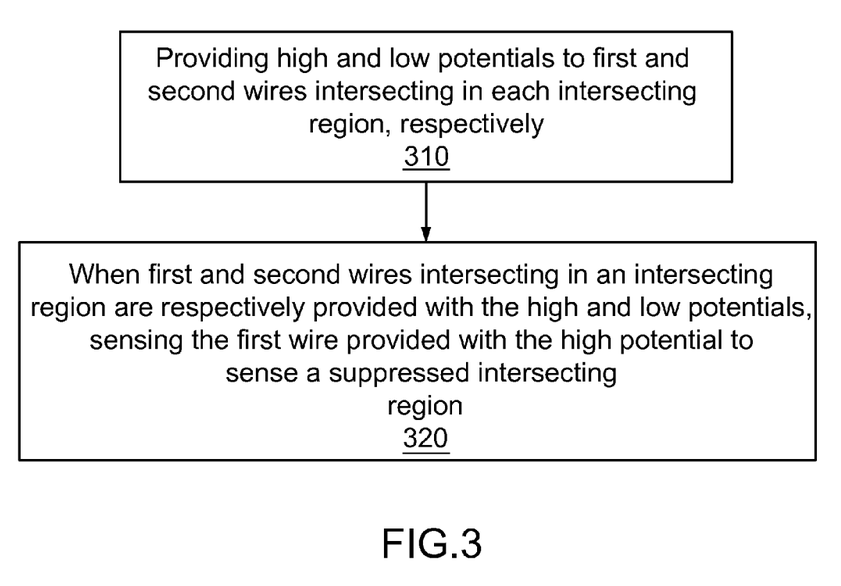
FIG. 3 is a flowchart illustrating the driving and sensing of suppressed intersecting regions according to the present invention.

FIG. 3 shows a method of sensing intersecting regions being suppressed on a resistive multi-point touch device. As shown in step 310, a high potential and low potential is provided to the first and second wires, respectively. As shown in step 320, when the first and second wires intersected in any intersecting regions are respectively provided with the high and low potentials, the first wires being provided with the high potential are sensed to determine respective suppressed intersecting region.

For example, the first wires are driven sequentially. During the driving period of each of the first wires, each of the second wires is sequentially driven. In this way, it can be sensed whether that an individual intersecting region on the first wires is being suppressed. Through driving each first wire, each intersecting region in the intersecting matrix is sensed, thus an intersecting region being suppressed can be sensed.

Accordingly, in a preferred embodiment of the present invention, a resistive multi-point touch device during sensing of suppressed intersecting regions (FIG. 4A) includes a sensing unit V1 and a driving unit D1. The driving unit provides a high potential VH1 and a low potential VL1, wherein the high potential VH1 is sequentially provided to one of the first wires (X1, X2, ..., X8), and the low potential VL1 is sequentially provided to one of the second wires (Y1, Y2, ..., Y8). The sensing unit V1 senses the wire being provided with the high potential VH1.

Figure 4A:
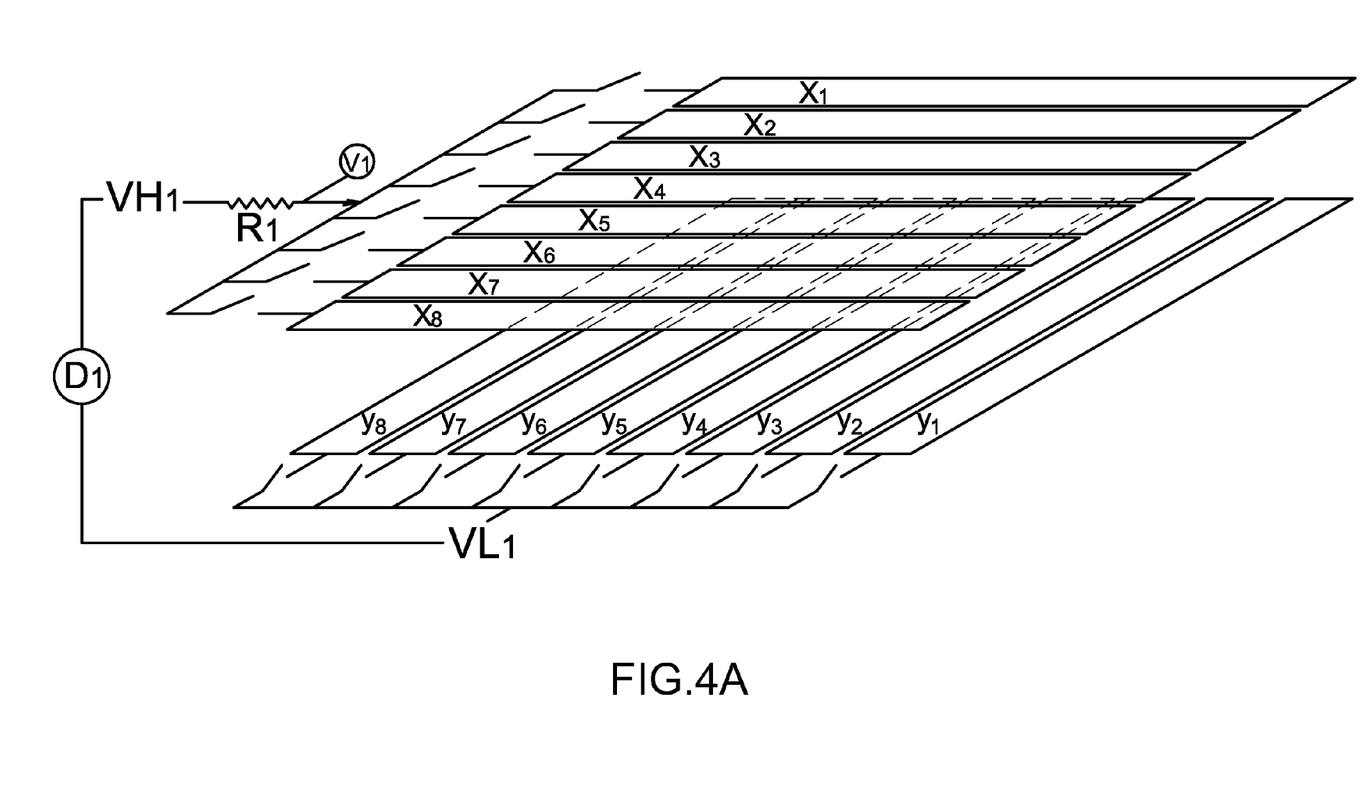
FIGS. 4A, 4B and 4C are structural diagrams illustrating suppressed intersecting regions of a resistive multi-point touch device according to the present invention.

Sensing of the first wires being provided with the high potential VH1 may include, but not limited to sensing potential, current or logic level, and may be performed at one or both ends of the first wires being provided with the high potential VH1. For example, in an example of the present invention, the high potential VH1 can be provided to each one of the first wires (X1, X2, ..., X8) through a boosting resistor R1, and a suppressed intersection region can be determined by sensing the potential, current or logic level at one end of the boosting resistor R1 (e.g. between the boosting resistor R1 and the wire).

Figure 4B:
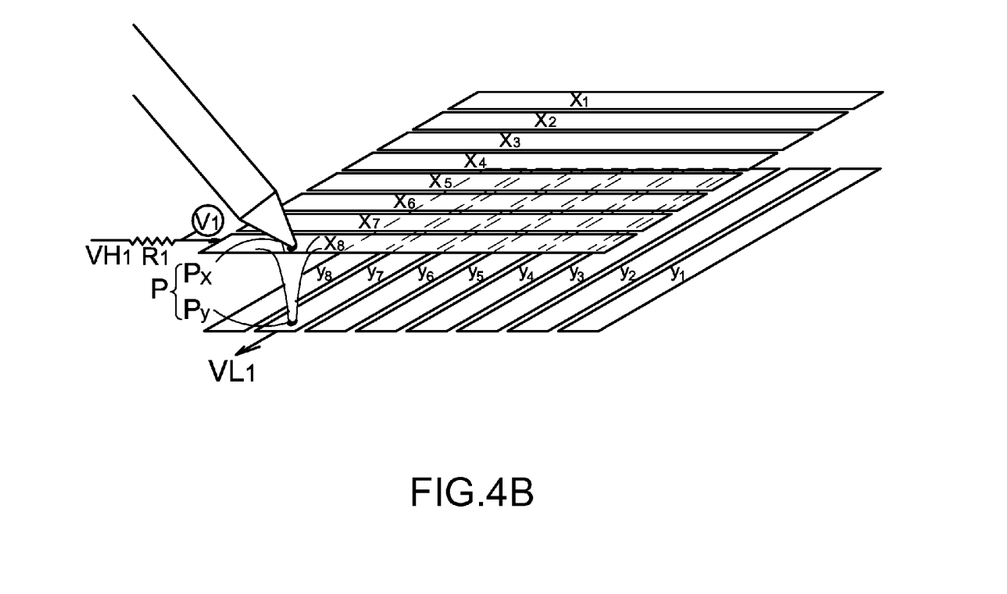
Figure 4C:
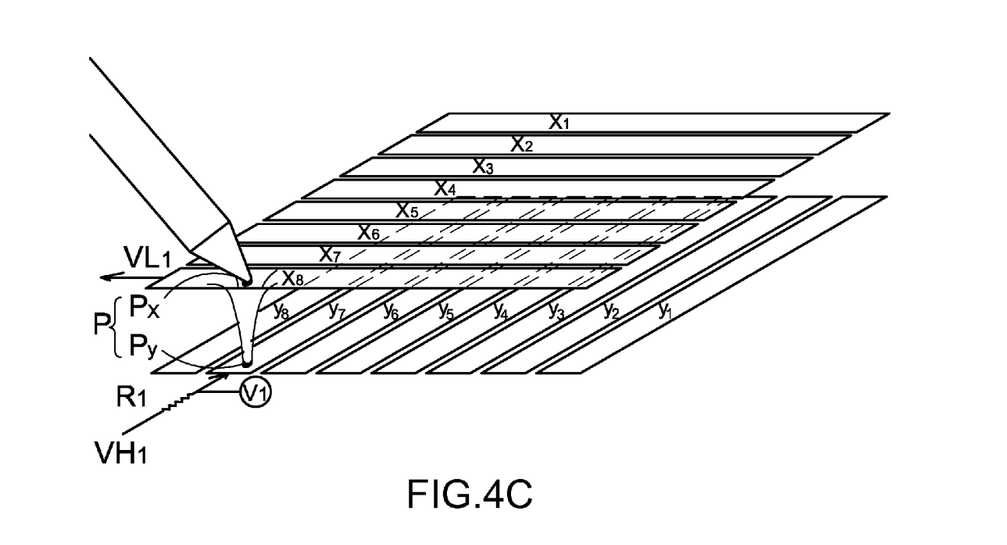

For example, when the high potential VH1 and the low potential VL1 is provided to the wires X1 and Y1, respectively, the sensing unit V1 is able to sense whether the intersecting region crossed by the wires X1 and Y1 is suppressed. More specifically, when it is time to sense the intersecting region crossed by the wires X1 and Y1, the driving unit D1 provides the high potential VH1 and the low potential VL1 is provided to the wires X1 and Y1, respectively, as shown in FIG. 4B. When the intersecting region of the wires X1 and Y1 is not suppressed, current would not flow from wire X1 to wire Y1, thus there is no significant change in the signal of the boosting resistor R1. The sensing unit V1 may then determine that the intersecting region of the wires X1 and Y1 is not suppressed. Similarly, when it is time to sense the intersecting region crossed by the wires X8 and Y7, the driving unit D1 provides the high potential VH1 and the low potential VL1 is provided to the wires X8 and Y7, respectively, as shown in FIG. 4B. When the intersecting region of the wires X8 and Y7 is suppressed, current would flow from wire X8 to wire Y7, the sensing unit V1 may then determine that the intersecting region of the wires X8 and Y7 is suppressed by sensing that there is a potential change in the boosting resistor R1. It can be appreciated that the driving unit may also provide low and high potentials to one of the first wires (X1, X2, ..., X8) and one of the second wires (Y1, Y2, ..., Y8), respectively, as shown in FIG. 4C.

Figure 5:
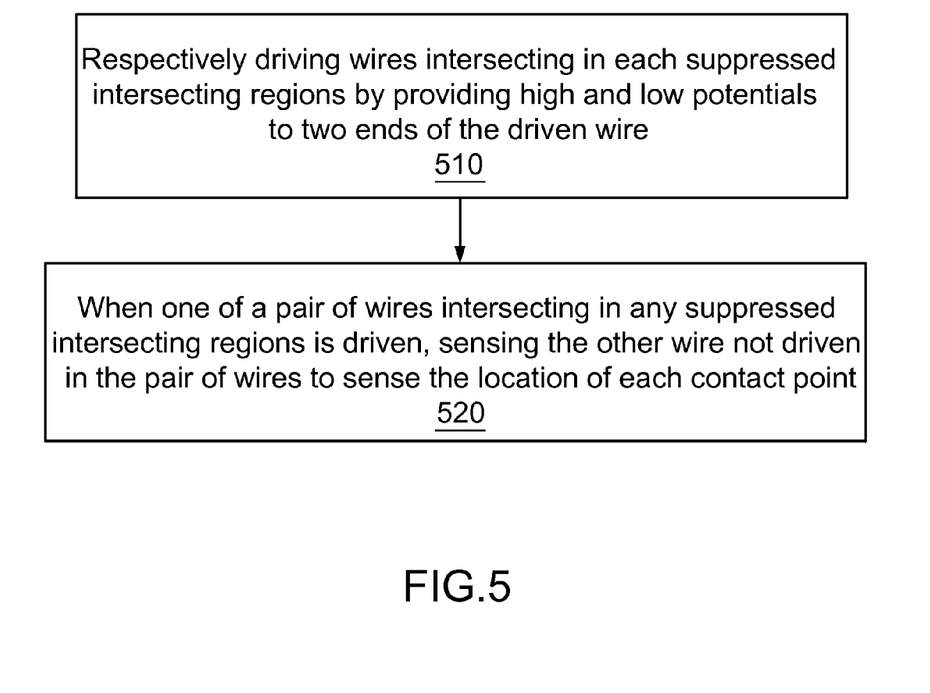
FIG. 5 is a flowchart illustrating the sensing of contact points according to the present invention.

FIG. 5 is a flowchart illustrating the steps of sensing at least a contact point based on each suppressed intersecting region. As in step 510, a wire in the suppressed intersecting region is driven, that is, high and low potentials are provided to two ends of the wire. And in step 520, when one wire in the pair of wires crossed in the suppressed intersecting region is driven, the other wire not driven is sensed to sense location of any contact points. Sensing of the wire not driven may include sensing one or both ends of the wire.

In other words, for each suppressed intersecting region, the pair of wires in the intersecting region is alternately driven, and the wire that is not driven is sensed in order to determine the 2-D coordinates of the contact point. For example, the first wire in this pair is driven first and the second wire is sensed, so as to identify the location of the contact point on the axis of the first wire as the first 1-D coordinate Px in the 2-D coordinates. Next, the second wire in this pair is driven and the first wire is sensed, so as to identify the location of the contact point on the axis of the second wire as the second 1-D coordinate Py in the 2-D coordinates. The present invention does not limit the order of driving the first and second wires. Once the first and second wires are sensed, the locations of the contact point on the axes of the first and second wires can be obtained and expressed as a 2-D coordinates (Px, Py).

Figure 6A:
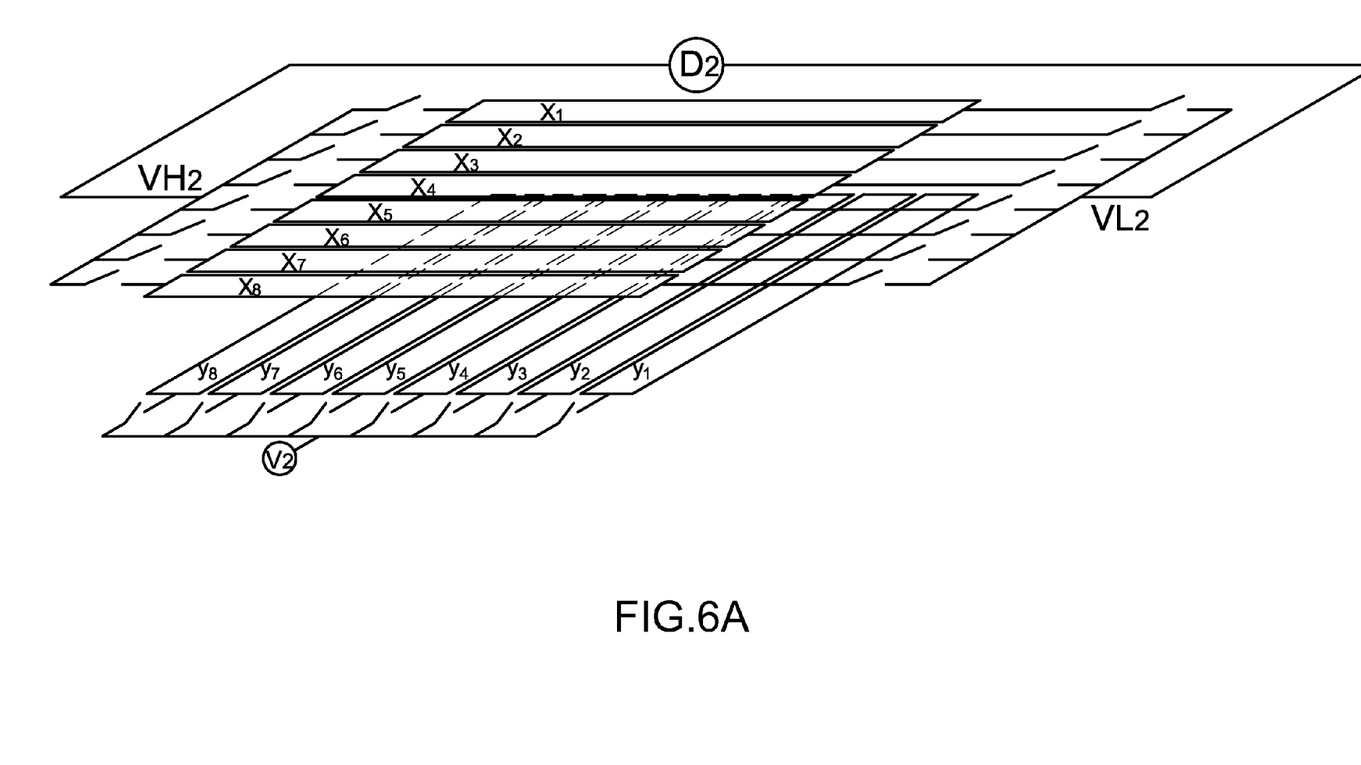
FIGS. 6A, 6B and 6C are structural diagrams illustrating the sensing of contact points on a resistive multi-point touch device according to the present invention.

In a preferred embodiment of the present invention, sensing of contact points in a resistive multi-point touch device is shown in FIG. 6A. The resistive multi-point touch device includes a plurality of wires, a sensing unit V2 and a driving unit D2. The plurality of wires are aforementioned first wires (X1, X2, ..., X8) and second wires (Y1, Y2, ..., Y8). The driving unit provides a high potential VH2 and a low potential VL2 to drive one of the wires, and the sensing unit V2 senses a wire intersected with the driven wire. Thus, when the driven wire and the sensed wire intersect on a suppressed intersecting region, the sensing unit V2 is able to sense the location of a contact point P on the axis of the driven wire.

Figure 6B:
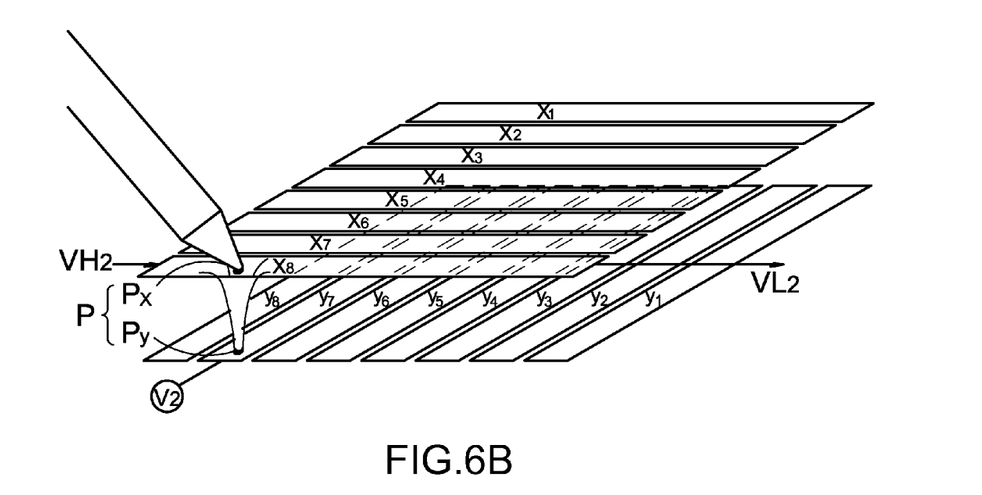
Figure 6C:
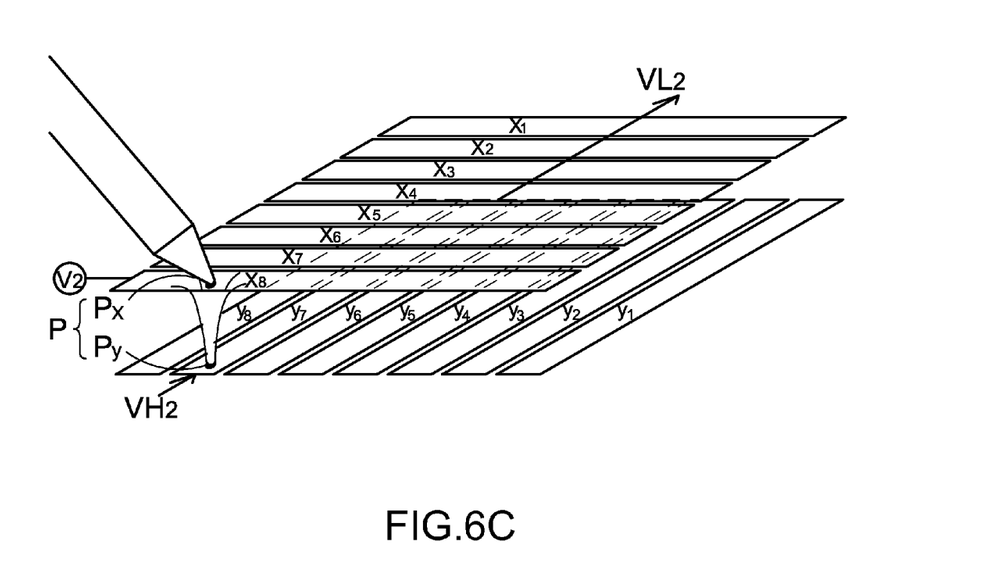

For example, if the suppressed intersecting region is a region intersected by wires X8 and Y7, as shown in FIG. 6B, the driving unit first provides a high potential VH2 and a low potential VL2 to respective ends of the wire X8, and the sensing unit senses the other wire Y7 to identify the location Px of the contact point P on the axis of the wire X8 (direction of the first wire). Similarly, as shown in FIG. 6C, the driving unit then provides a high potential VH2 and a low potential VL2 to respective ends of the wire Y7, and the sensing unit senses the other wire X8 to identify the location Py of the contact point P on the axis of the wire Y7 (direction of the second wire).

In another example of the present invention, the driving unit D1 and the sensing unit V1 sequentially senses respective intersecting region to sense any suppressed intersecting regions. The driving unit D2 and the sensing unit V2 sequentially senses respective intersecting region to sense a 2-D image of the first wire axis and a 2-D image of the second wire axis in each intersecting region, and then determine the locations of the contact point in the 2-D images of first and second wire axes based on the suppressed intersecting regions. Obviously, compared to the above example where the suppressed intersecting regions are first identified, and then only the suppressed intersecting regions are sensed to identify the locations of the contact points, this example has lower efficiency.

In the above descriptions, sensing performed by the sensing unit V1 may include, but not limited to sensing a potential, current or logic level, and sensing performed by the sensing unit V2 include sensing the actual value of the signal, such as a voltage or a current value, and that sensing of two dimensions is required for each intersecting region. Thus, sensing of the suppressed intersecting region is much faster the sensing of the contact point.

The numbers of the first wires (X1, X2, ..., X8) and second wires (Y1, Y2, ..., Y8) are for illustration purpose only, and not a limitation. The numbers of the first and second wires can be changed according to specific design needs. Thus, when there are m first wires and n second wires, there are a total of m*n intersecting regions that need to be sensed. The more wires there are, the longer it takes to sense all the intersecting regions. As a result, raising the speed of sensing the intersecting regions raises improve overall efficiency.

Figure 7:
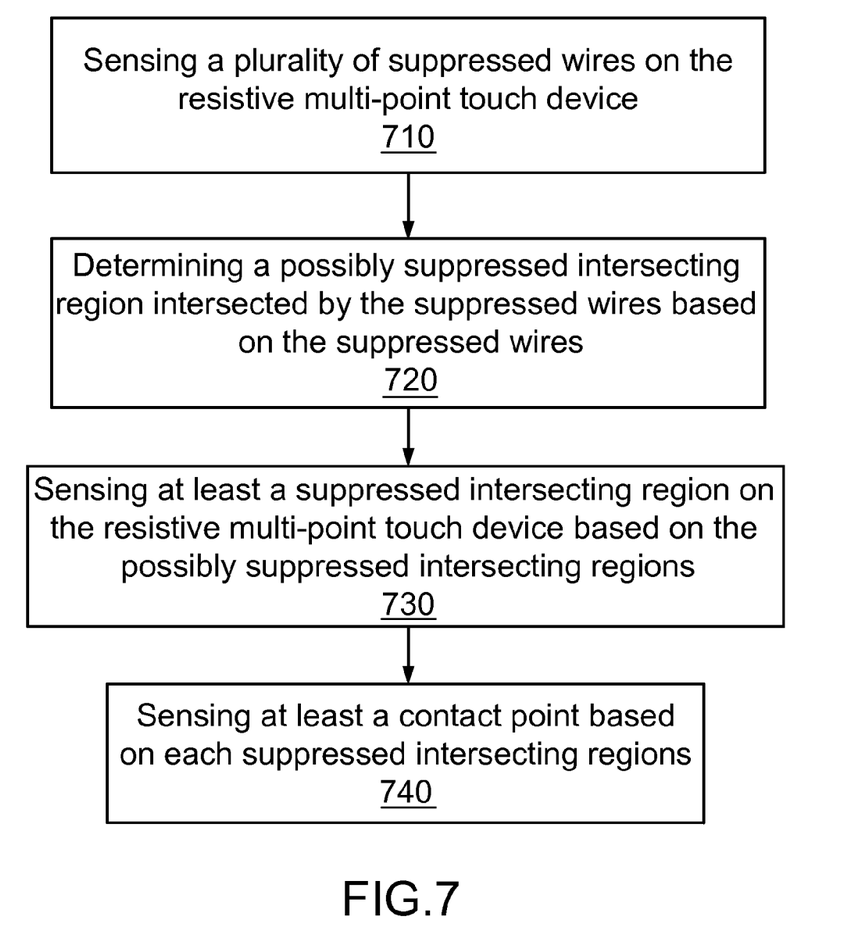
FIG. 7 is a flowchart illustrating the sensing of suppressed wires according to the present invention.

Accordingly, a best mode of the present invention is shown in FIG. 7. As in step 710, a plurality of wires on a resistive multi-point touch device being suppressed are sensed. In step 720, possible suppressed intersecting regions crossed by the suppressed wires are determined based on the suppressed wires. In step 730, at least one suppressed intersecting regions on the resistive multi-point touch device is sensed based on the possible suppressed intersecting regions. In step 740, at least one contact point is sensed based on the suppressed intersecting region.

In other words, which one of the first and second wires being suppressed are first determined, and then possible suppressed intersecting regions are determined based on the suppressed first and second wires. Compared to FIGS. 3, 4A and 4C where all intersecting regions are sensed for suppression, the present embodiment only needs to sense the already determined possible suppressed intersecting regions to identify suppressed intersecting regions.

Figure 8A:
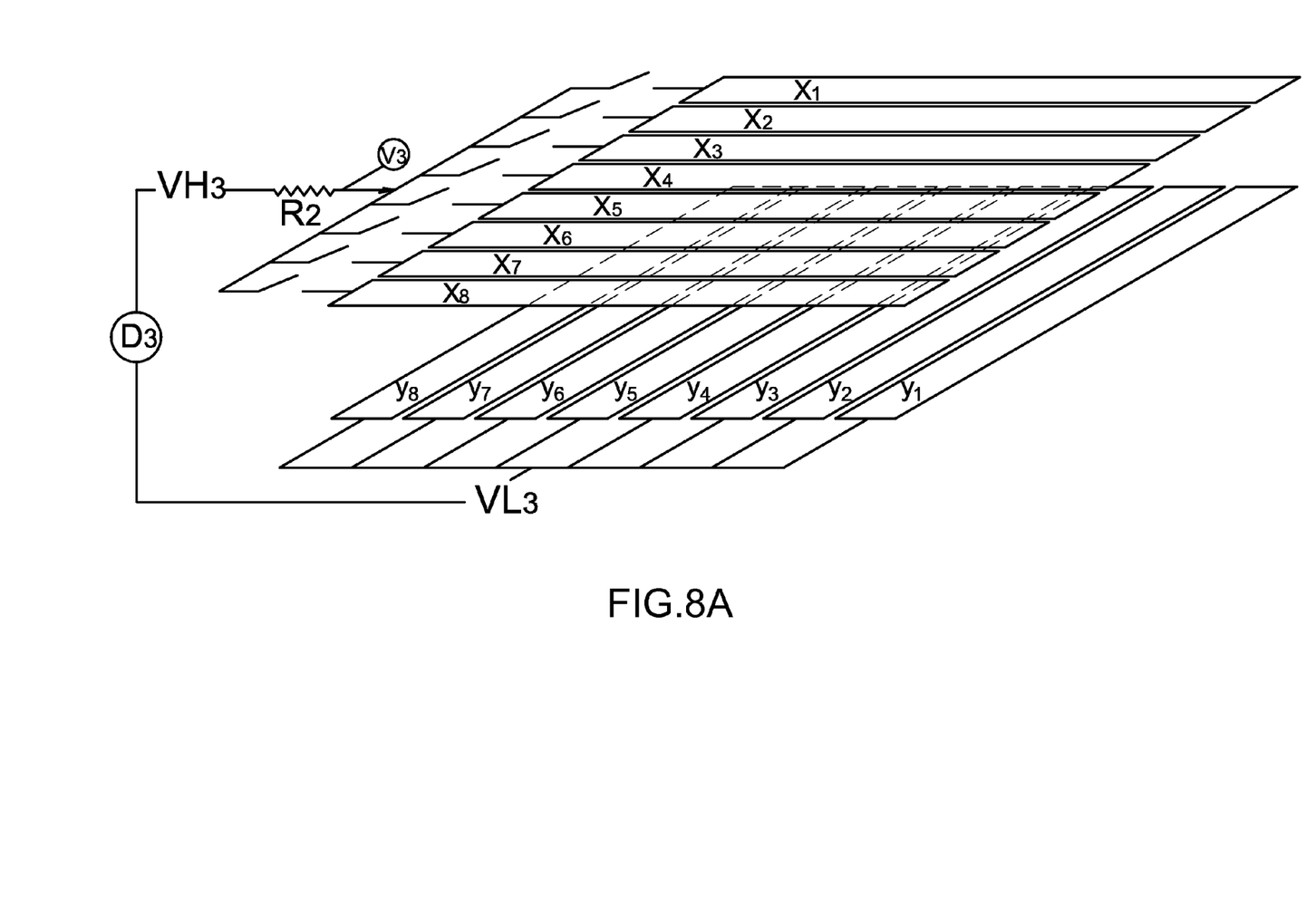
FIGS. 8A, 8B and 8C are structural diagrams illustrating the sensing of c suppressed wires on a resistive multi-point touch device according to the present invention.

In a preferred embodiment of the present invention, sensing of suppressed wires on a resistive multi-point touch device is shown in FIG. 8A. The resistive multi-point touch device includes a plurality of wires, a sensing unit V3 and a driving unit D3. The plurality of wires are aforementioned first wires (X1, X2, ..., X8) and second wires (Y1, Y2, ..., Y8). The driving unit D3 sequentially provides a high potential VH3 to drive each of the wires and a low potential VL3 to all the wires intersecting with the wire being driven to the high potential VH3, so as to sense any suppressed wire.

Figure 8B:
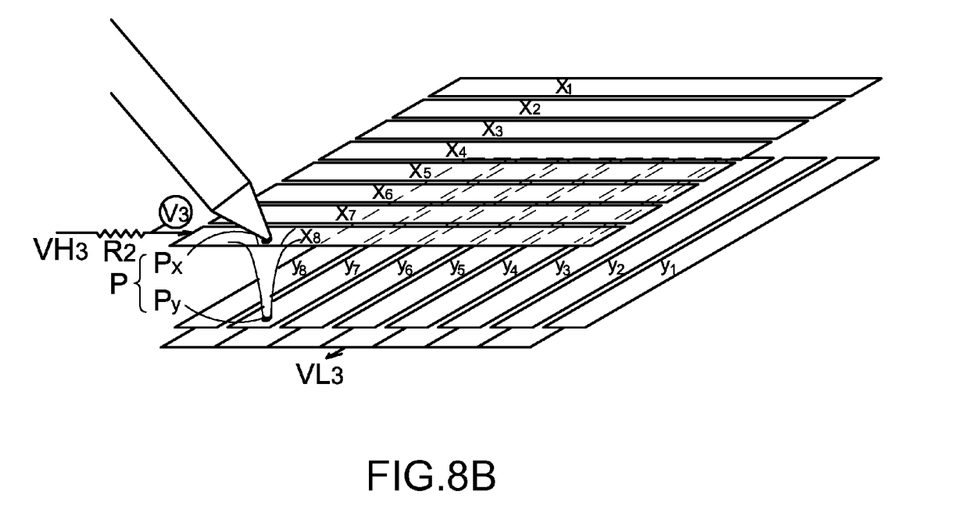
Figure 8C:
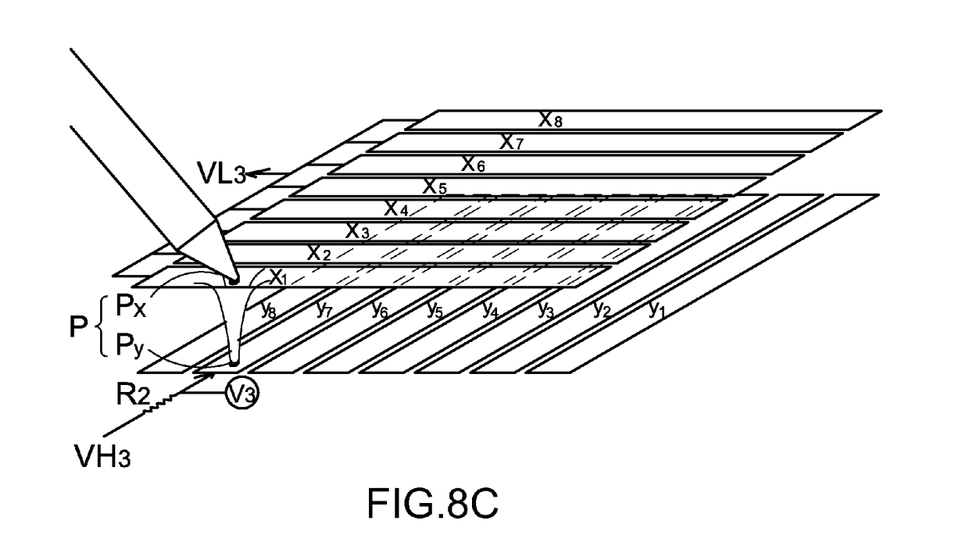

For example, as shown in FIG. 8B, the driving unit D3 sequentially provides a high potential VH3 to each of the first wires (X1, X2, ..., X8), and provides a low potential VL3 to all the second wires (Y1, Y2, ..., Y8) intersecting the first wire being driven to high potential VH3. The sensing unit V3 senses the first wire being driven to high potential VH3. In this example, the first wires X1 to X7 are not suppressed, so current would not flow from the unsuppressed first wires X1 to X7 to any second wire. The sensing unit V3 determines that none of these wires X1 to X7 are being suppressed. On the other hand, when the first wire X8 is driven to high potential VH3, current flows from the first wire X8 to the second wire Y7, and the sensing unit V3 can determine that the first wire X8 is being suppressed.

Similarly, the driving unit D3 sequentially provides a high potential VH3 to each of the second wires (Y1, Y2, ..., Y8), and provides a low potential VL3 to all the first wires (X1, X2, ..., X8) intersecting the second wire being driven to high potential VH3. The sensing unit V3 then senses any suppressed second wire, for example, second wire Y7.

Sensing of the wire being driven to the high potential VH3 is similar to sensing of the first wire being driven to the high potential VH1, which may include, but not limited to sensing a potential, current or logic level, and may be performed at one or both ends of the first wires being driven to the high potential VH3. For example, in an example of the present invention, the high potential VH3 can be provided to each of the first wires through a boosting resistor R2, and a suppressed wire can be determined by sensing the potential, current or logic level at one end of the boosting resistor R2 (e.g. between the boosting resistor R2 and the wire).

Thus, by knowing which wires (e.g. wires X8 and Y7) are suppressed, at least a possibly suppressed intersecting region can be determined. When there are less than three possibly suppressed intersecting regions, these regions are the suppressed intersecting regions.

In addition, the driving unit D3 can simultaneously provide the high potential VH3 to a plurality of wires, and the sensing unit V3 can simultaneously provide the high potential VH3 to some or all of wires, but the simultaneously driven wires all have to be the same group (e.g. first or second) of wires.

In the above example, the wires are selectively driven. It can be appreciated by those with ordinary skills in the arts that the selection of the wires may be implemented by a switching device, such as a switch, a multiplexer, a bus or etc., the present invention is not limited to this. In addition, the aforementioned high potentials VH1, VH2 and VH3 can be the same or different. Similarly, the aforementioned low potentials VL1, VL2 and VL3 can be the same or different, the present invention is not limited to these. Moreover, the aforementioned boosting resistors can be the same or different, the present invention is not limited to these.

Figure 9:
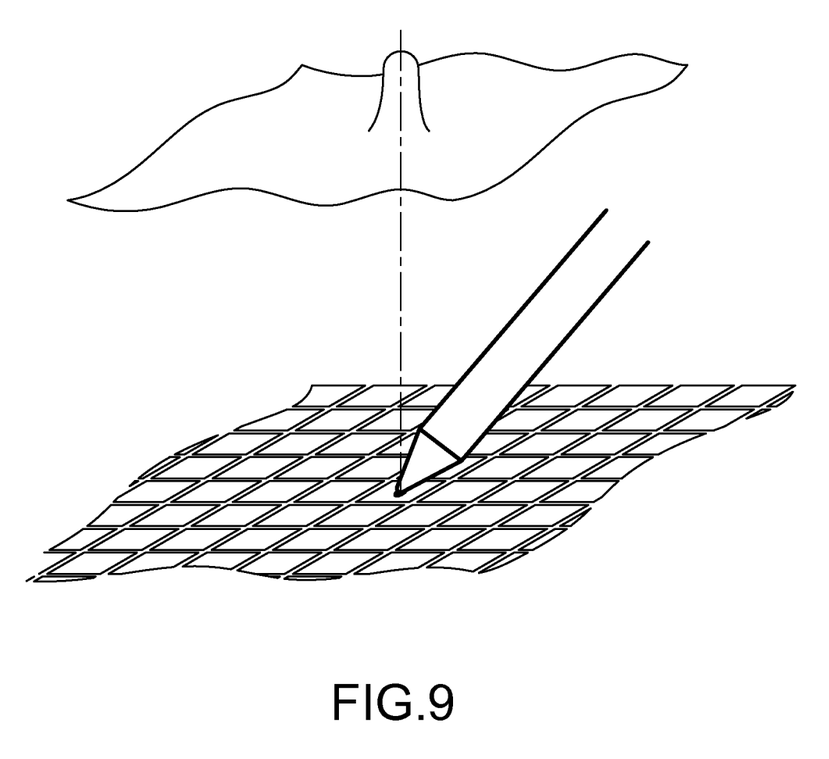
FIG. 9 is a schematic diagram illustrating an intersecting image produced as a result of touching by a sharp edged object.
Figure 10A:
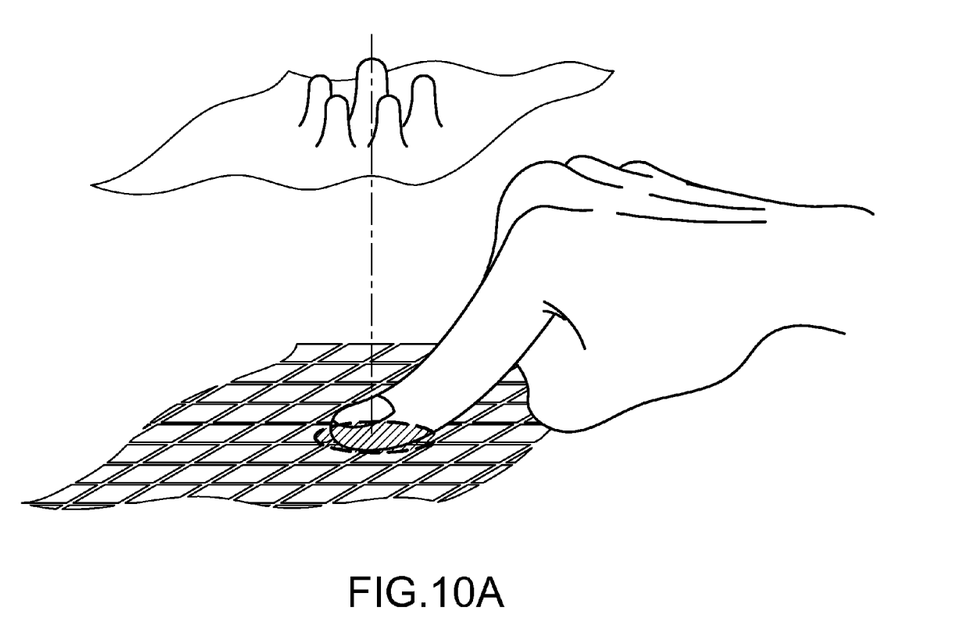
FIGS. 10A and 10B are schematic diagrams illustrating intersecting images produced as a result of touching by one finger and two fingers, respectively.

According to the above, after sensing, contact point can form an intersecting image as shown in FIG. 9. When an object with a sharp end touches the device, the intersecting image will exhibit a corresponding contact-point signal. When a finger or an object with a blunt end touches the device, the intersecting image will exhibit a plurality of corresponding contact-point signals, as shown in FIG. 10A.

Figure 10B:
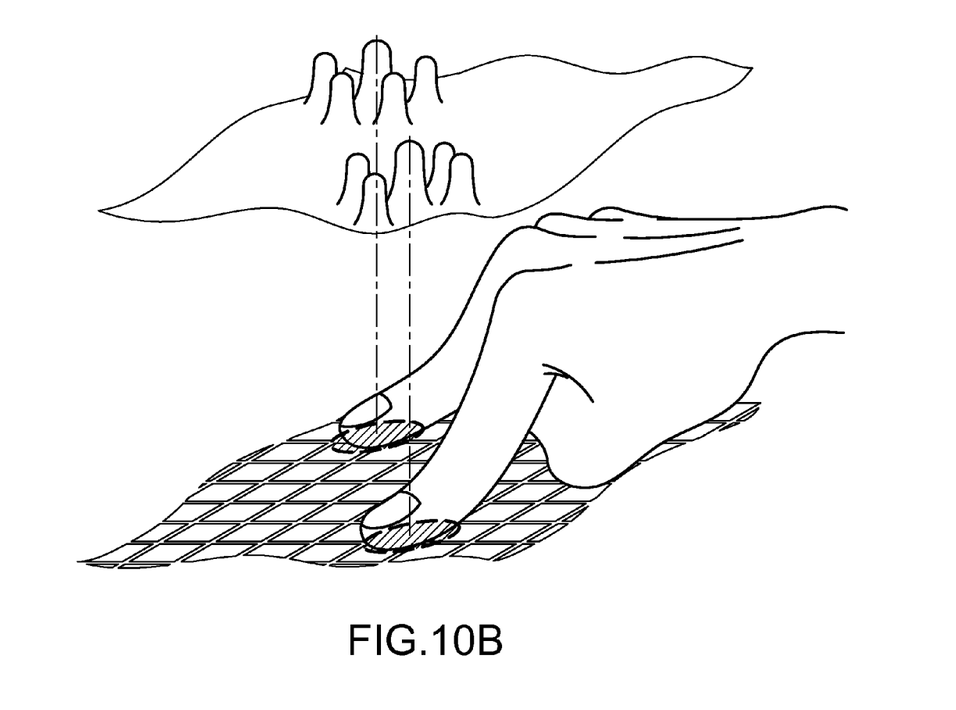

Contact points corresponding to the same object will be close to each other, such as those shown in FIG. 10B, so each suppressed location can be accurately identified. In another example of the present invention, the time contact points occurred may also be used to analyze the corresponding contact points of the objects.

By analyzing the intersecting image, the type of object can be determined based on the number of contact points, such as whether the object is a pen or a finger. In addition, the pressure generated by the object can be simulated based on the number of contact points.

Moreover, the trajectory of a moving object touching the device can be tracked based on analysis of differences between continuous intersecting images at different time instances in order to determine specific gesture. For examples, a gesture may be determined based on the moving trajectories of a pair of objects, which include: moving away from each other, one objecting moving away from the other, moving towards each other, one object moving towards each other, circling around each other, and one object circling around the other.

In one example of the present invention, the type of object can be determined based on the number of contact points, such as whether the object is a pen or a finger. In addition, the pressure generated by the object can be simulated based on the number or distribution of the contact points. When one object has several corresponding contact points, the position of the center of mass of those contact points can be regarded as the contact location of the object.

Accordingly, another embodiment of the present invention is a resistive multi-point touch device, which includes a plurality of wires, first and second driving units, and first and second sensing units. The wires include a plurality of first and second wires intersecting each other to form a plurality of intersecting regions. When at least one object touches the device, the first and second wires come into contact to form at least one contact point of the object.

The first driving unit and the first sensing unit can be the driving unit D1 and sensing unit V1 described in steps 310 and 320 of FIG. 3 or FIGS. 4A to 4C. When the second driving unit respectively provides a high potential and a low potential to a first wire and a second wire intersecting in each intersecting region, the first sensing unit senses the first wires being driven to high potentials to determine suppressed intersecting regions.

The second driving unit and the second sensing unit can be the driving unit D2 and sensing unit V2 described in steps 510 and 520 of FIG. 6A to 6C. The second driving unit respectively drives the wires in each suppressed intersecting regions. When one of a pair of intersecting wires in a suppressed intersecting region is driven by the second driving unit, the second sensing unit senses the other wire not driven in this pair to sense the location of a contact point. The second driving unit provides high and low potentials to the driven wire.

The details related to this embodiment have been disclosed above and will not be further described.

In addition, yet another embodiment of the present invention is a resistive multi-point touch device, which includes a plurality of wires, first, second and third driving units, and first, second and third sensing units. The wires include a plurality of first and second wires intersecting each other to form a plurality of intersecting regions. When at least one object touches the device, the first and second wires come into contact to form at least one contact point of the object.

The first driving unit and the first sensing unit can be the driving unit D3 and sensing unit V4 described in steps 710 to 740 of FIG. 7 or FIGS. 8A to 8C. The first driving unit selectively provides a high potential to the wires, and the first sensing unit senses the wire being driven to the high potential to sense a plurality of suppressed wires. The intersecting regions intersected by these suppressed wires become possible suppressed intersecting regions. When the wire driven to the high potential by the first driving unit is a first wire, the driving unit provides a low potential to all the second wires. Conversely, when the wire driven to the high potential by the first driving unit is a second wire, the driving unit provides low potential to all the first wires.

The second driving unit and the second sensing unit can be the driving unit D1 and sensing unit V1 described in steps 310 and 320 of FIG. 3 or FIGS. 4A to 4C. When the second driving unit respectively provides a high potential and a low potential to a first wire and a second wire intersecting in each possible intersecting region, the second sensing unit senses the first wires being driven to high potentials to determine suppressed intersecting regions.

The third driving unit and the third sensing unit can be the driving unit D2 and sensing unit V2 described in steps 510 and 520 of FIG. 6A to 6C. The third driving unit respectively drives the wires in each suppressed intersecting regions. When one of a pair of intersecting wires in a suppressed intersecting region is driven by the third driving unit, the third sensing unit senses the other wire not driven in this pair to sense the location of a contact point. The third driving unit provides high and low potentials to the driven wire.

The details related to this embodiment have been disclosed above and will not be further described.

Compared to the prior art, the driving and sensing method of the present invention would not render a weak signal when there are numerous contact points at the first place, nor does it require different determination criteria for different sensing regions. In addition, the present invention can not only sense which intersecting regions has been suppressed, but also determines the locations of contact points in the intersecting regions, that is, the present invention is able to achieve higher resolution with fewer wires.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A resistive multi-point touch device, comprising:
a plurality of wires, including a plurality of first and second wires intersecting each other in a plurality of intersecting regions, when at least one object suppressing the device, the first and second wires contacting each other to form at least one contact point corresponding to the at least one object;
a first driving unit and a first sensing unit, the first driving unit selectively and respectively providing a high potential to the wires, and the first sensing unit sensing the wires provided with the high potential by the first driving unit to sense a plurality of suppressed wires, intersecting regions intersected by the suppressed wires being possibly suppressed intersecting regions, when the wire to which the first driving unit providing the high potential being a first wire, the first driving unit providing a low potential to all the second wires, and when the wire to which the first driving unit providing the high potential being a second wire, the first driving unit providing a low potential to all the first wires;
a second driving unit and a second sensing unit, when the second driving unit selectively and respectively providing the high and low potentials to the first and second wires intersecting in each of the possibly suppressed intersecting regions, the second sensing unit sensing the first wire provided with the high potential by the second driving unit to sense any suppressed intersecting region; and a third driving unit and a third sensing unit, the third driving unit respectively driving the wires intersecting in each suppressed intersecting regions, when one of a pair of wires intersecting in any suppressed intersecting regions being driven by the third driving unit, the third sensing unit sensing the other wire not driven in the pair of wires to sense the location of each contact point, wherein the third driving unit provides the high and low potentials to the driven wire and wherein the third sensing unit senses the potential at one or two ends of the wire being sensed.

2. The resistive multi-point touch device of claim 1, wherein the first and second sensing units sense one of a current, potential and logic level at one end of a boosting resistor, and the first and second driving units provide the high potential via the boosting resistor.

3. The resistive multi-point touch device of claim 1, wherein the high potential provided by the first, second and third driving units are respectively different potentials, and the low potential provided by the first, second and third driving units are respectively different potentials.

4. The resistive multi-point touch device of claim 1, wherein when the wire in the pair sensed by the third sensing unit is a first wire, the third sensing unit determines a first 1-D coordinate of a 2-D coordinate based on the sensed potential, and when the wire in the pair sensed by the third sensing unit is a second wire, the third sensing unit determines a second 1-D coordinate of the 2-D coordinate based on the sensed potential.

5. A resistive multi-point touch device, comprising:
a plurality of wires, including a plurality of first and second wires intersecting each other in a plurality of intersecting regions, when at least one object suppressing the device, the first and second wires contacting each other to form at least one contact point corresponding to the at least one object;

a first driving unit and a first sensing unit, when the first driving unit selectively and respectively providing high and low potentials to the first and second wires intersecting in each of the intersecting regions, the first sensing unit sensing the first wire provided with the high potential by the first driving unit to sense a suppressed intersecting region; and a second driving unit and a second sensing unit, the second driving unit respectively driving the wires intersecting in each suppressed intersecting regions, when one of a pair of wires intersecting in any suppressed intersecting regions being driven by the second driving unit, the second sensing unit sensing the other wire not driven in the pair of wires to sense the location of each contact point, wherein the second driving unit provides the high and low potentials to the driven wire and wherein the second sensing unit senses the potential at one or two ends of the wire being sensed.

6. The resistive multi-point touch device of claim 5, wherein the first sensing unit senses one of a current, potential and logic level at one end of a boosting resistor, and the first driving unit provides the high potential via the boosting resistor.

7. The resistive multi-point touch device of claim 5, wherein the high potential provided by the first and second driving units are respectively different potentials, and the low potential provided by the first and second driving units are respectively different potentials.

8. The resistive multi-point touch device of claim 5, wherein when the wire in the pair sensed by the second sensing unit is a first wire, the second sensing unit determines a first 1-D coordinate of a 2-D coordinate based on the sensed potential, and when the wire in the pair sensed by the second sensing unit is a second wire, the second sensing unit determines a second 1-D coordinate of the 2-D coordinate based on the sensed potential.

9. A resistive multi-point touch method, comprising:
sensing at least one suppressed intersecting region on a resistive multi-point touch device, wherein the resistive multi-point touch device includes a plurality of wires including a plurality of first and second wires intersecting each other in a plurality of intersecting regions, when at least one object suppresses the device, the first and second wires contact each other to form at least one contact point corresponding to the at least one object; and sensing the at least one contact point based on each suppressed intersecting region wherein sensing at least one contact point includes:
respectively driving the wires intersecting in each suppressed intersecting regions by providing high and low potentials to two ends of the driven wire;

when one of a pair of wires intersecting in any suppressed intersecting regions being driven, sensing the other wire not driven in the pair of wires to sense the location of each contact point, wherein sensing the other wire includes sensing the potential at one or two ends of the other wire.

10. The resistive multi-point touch method of claim 9, wherein sensing at least one suppressed intersecting region includes:
respectively providing high and low potentials to the first and second wires intersecting in each of the intersecting regions; and when respectively providing the high and low potentials to the first and second wires intersecting in the intersecting regions, sensing the first wire provided with the high potential to sense a suppressed intersecting region.

11. The resistive multi-point touch method of claim 10, wherein sensing of the first wire includes sensing one of a current, potential and logic level at one end of a boosting resistor, and the high potential is provided via the boosting resistor.

12. The resistive multi-point touch method of claim 9, wherein when the sensed wire in the pair is a first wire, determining a first 1-D coordinate of a 2-D coordinate based on the sensed potential, and when the sensed wire in the pair is a second wire, determining a second 1-D coordinate of the 2-D coordinate based on the sensed potential.

13. The resistive multi-point touch method of claim 9, further comprising sensing a plurality of suppressed wires on the resistive multi-point touch device, wherein the at least one suppressed intersecting region is sensed based on the plurality of suppressed wires.

14. The resistive multi-point touch method of claim 13, wherein sensing the suppressed wires includes:
providing a high potential to the wires;
when the wire provided with the high potential being a first wire, providing a low potential to the second wires;
when the wire provided with the high potential being a second wire, providing the low potential to the first wires; and sensing the wire provided with the high potential to sense any suppressed wire.

15. The resistive multi-point touch method of claim 14, wherein sensing the wire provided with the high potential includes sensing one of a current, potential and logic level at one end of a boosting resistor, and the high potential is provided via the boosting resistor.

16. The resistive multi-point touch method of claim 14, wherein sensing at least one suppressed intersecting region includes:
   respectively providing high and low potentials to the first and second wires intersecting in each of possibly suppressed intersecting regions in which the suppressed wires intersect; and
   when respectively providing the high and low potentials to the first and second wires intersecting in the possibly suppressed intersecting regions, sensing the first wire provided with the high potential to sense a suppressed intersecting region.

17. The resistive multi-point touch method of claim 13, wherein when the number of possibly suppressed intersecting regions in which the suppressed wires intersect is smaller or equal to three, the at least one suppressed intersecting region is the possibly suppressed intersecting region.

* * * * *